United States Patent [19]
Cameron

[11] Patent Number: 5,983,095
[45] Date of Patent: *Nov. 9, 1999

[54] SYSTEM AND METHOD OF CALLING A SINGLE MOBILE TELEPHONE THROUGH MULTIPLE DIRECTORY NUMBERS IN A RADIO TELECOMMUNICATIONS NETWORK

[75] Inventor: Duncan Peter Craig Cameron, Fancombe Godalming, United Kingdom

[73] Assignee: Telefonaktiebolaget LM Ericsson (publ), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,655

[22] Filed: Jul. 26, 1996

[51] Int. Cl.$^6$ ................................. H04M 11/00
[52] U.S. Cl. ........................... 455/414; 455/433
[58] Field of Search ................... 455/551, 433, 455/495, 567, 414, 417, 33.1, 432, 445

[56] References Cited

U.S. PATENT DOCUMENTS

| | | | |
|---|---|---|---|
| 4,677,653 | 6/1987 | Weiner et al. | 379/58 |
| 4,742,560 | 5/1988 | Arai | 455/33 |
| 5,371,781 | 12/1994 | Ardon | 455/551 |
| 5,400,390 | 3/1995 | Salin | 455/433 |
| 5,428,666 | 6/1995 | Fyfe et al. | 455/33.1 |
| 5,437,053 | 7/1995 | Sawa et al. | 455/33.1 |
| 5,448,622 | 9/1995 | Huttunen | 379/58 |
| 5,530,736 | 6/1996 | Comer et al. | 455/551 |
| 5,544,235 | 8/1996 | Ardon | 379/177 |
| 5,561,840 | 10/1996 | Alvesalo et al. | 455/433 |
| 5,579,372 | 11/1996 | Astrom | 455/466 |
| 5,583,916 | 12/1996 | Maenpaa | 455/433 |
| 5,600,705 | 2/1997 | Maenpaa | 455/433 |
| 5,711,006 | 1/1998 | Brochu et al. | 455/433 |
| 5,715,516 | 2/1998 | Howard et al. | 455/33.1 |
| 5,764,730 | 6/1998 | Rabe et al. | 455/415 |

FOREIGN PATENT DOCUMENTS

| | | |
|---|---|---|
| 0378450A2 | 7/1990 | United Kingdom . |
| WO 94/29992 | 12/1994 | WIPO . |

OTHER PUBLICATIONS

Newton's Telecom Dictionary 10th Edition, p. 568, 1996.

Adrian Matthews; "Application of IS–136 to Personal Communication Services"; Electro '96 Professional Program Proceedings, Somerset, NJ, Apr. 30 –May 2, 1996; *Institute of Electrical and Electronics Engineers*; Apr. 30, 1996, pp. 223–228.

Yi–Bing Lin and Steven K. DeVries; "Supporting interconnection with the PSTN PCS Network Signaling Using SS7"; *IEEE Personal Communications*; vol. 2, No. 3, Jun. 1, 1995, pp. 44–55.

Newton's Telecom Dictionary, 1998.

*Primary Examiner*—David R. Hudspeth
*Assistant Examiner*—M. David Sofolleous
*Attorney, Agent, or Firm*—Smith & Danamraj, P.C.

[57] ABSTRACT

A system and method in a radio telecommunications network of utilizing a plurality of telephone numbers with a single mobile telephone by changes to the network rather than the mobile telephone are disclosed. The system provides a mobile subscriber with an indication of the directory number dialed by the calling party. A plurality of directory numbers, a plurality of mobile identification numbers (MINs), and a plurality of alpha-numeric strings are stored in a database in the network such as a home location register (HLR). Several directory numbers are associated with the mobile telephone's MIN, and then each directory number is associated with an alpha-numeric string. When a directory number is dialed, an associated MIN and alpha-numeric string are identified. The MIN and alpha-numeric string are then transported through the network to the mobile telephone while the mobile telephone is being alerted. The called subscriber is informed of the dialed directory number either by a short message service (SMS) message carrying the alpha-numeric string, or by substituting the dialed directory number for a calling line identification (CLI) number in an Alert With Info signal sent to the mobile telephone.

5 Claims, 2 Drawing Sheets

SYSTEM AND METHOD OF CALLING A SINGLE MOBILE TELEPHONE THROUGH MULTIPLE DIRECTORY NUMBERS IN A RADIO TELECOMMUNICATIONS NETWORK

BACKGROUND OF THE INVENTION

1. Technical Field of the Invention

This invention relates to radio telecommunication systems and, more particularly, to a system and method of calling a single mobile telephone through multiple directory numbers without modifing the mobile telephone.

2. Description of Related Art

Many mobile subscribers utilize their mobile telephones for more than one purpose, and desire to answer incoming calls differently, depending on the nature of the call. They may accept both business and personal calls on the same telephone, or they may have more than one business or more than one source of incoming business calls. A mobile plumber, for example, may have calls coming in on both his own business telephone number as well as on a 800-number from a referral group. The plumber may answer the calls differently, depending on which number was called.

For different callers, or calls to different numbers, the subscriber may wish to answer the call in different ways, ignore the call, or choose to have the call transferred in different ways. Currently, the only way for a subscriber utilizing a standard mobile telephone to distinguish between incoming calls is through a distinctive alerting feature which alerts the subscriber through a series of ringing pulses that an incoming call is, for example, a call to a group of mobile telephones. Other than this limited capability, however, mobile subscribers utilizing standard mobile telephones currently do not have any way to know the nature of an incoming call.

Although there are no known prior art teachings of a solution to the aforementioned deficiency and shortcoming such as that disclosed herein, there are a number of references that discusses subject matter that bears some relation to matters discussed herein. U.S. Pat. No. 4,677,653 to Weiner et al. (Weiner) discloses an adaptor for a cellular mobile telephone unit that converts the unit to include a plurality of telephone numbers. A plurality of ROMs, configured as Number Assignment Modules (NAMs), are connected through a multi-position switch to the unit's microprocessor. Thus, the telephone may be configured to operate, one at a time, with a different telephone number by selecting a different NAM with the multi-position switch. Weiner thus requires modification of the mobile telephone itself, and does not teach or suggest a method of simultaneously utilizing multiple telephone numbers with a single mobile telephone by changes to the cellular network rather than the mobile telephone. In addition, Weiner does not teach or suggest a network implementation that provides the mobile subscriber with an indication of the directory number dialed by the calling party. The present invention discloses a network implementation that associates multiple Directory Numbers (DNs) with a single Mobile Identification Number (MIN) in a Home Location Register (HLR) to enable several directory numbers to reach a single mobile telephone, and then passes the dialed DN to the mobile telephone.

European Patent Application EP 0,378,450 A2 discloses a cellular telephone containing several different telephone numbers. Also described is the transfer of a telephone number from a portable radio telephone to a mobile radio telephone which results in the mobile telephone simultaneously having two or more telephone numbers. However, EP 0,378,450 A2 does not teach or suggest a method of utilizing multiple telephone numbers with a single mobile telephone by changes to the cellular network rather than the mobile telephone. In addition, EP 0,378,450 A2 does not teach or suggest a network implementation that provides the mobile subscriber with an indication of the directory number dialed by the calling party. The present invention provides such a network implementation.

U.S. Pat. No. 4,742,560 to Arai (Arai) discloses a mobile cellular telephone which has different telephone numbers for different service areas stored in a Number Assignment Module (NAM) in the mobile telephone. The telephone numbers are stored in the telephone in conjunction with the telephone's MIN and with a respective service area identification code. Thus, Arai requires modification of the mobile telephone itself, and does not teach or suggest a method of utilizing multiple telephone numbers with a single mobile telephone by changes to the cellular network rather than the mobile telephone. In addition, Arai does not teach or suggest a network implementation that provides the mobile subscriber with an indication of the directory number dialed by the calling party. The present invention provides such a network implementation.

U.S. Pat. No. 5,448,622 to Huttunen (luttunen) discloses a cellular radio telephone converted to operate with a plurality of telephone numbers. All of the telephone numbers may be concurrently enabled for incoming calls, and the telephone may indicate on a visual display, the telephone number which is being called. However, Huttunen requires modification of the mobile telephone itself, and does not teach or suggest a method of utilizing multiple telephone numbers with a single mobile telephone by changes to the cellular network rather than the mobile telephone. In addition, Huttunen does not teach or suggest a network implementation that provides the mobile subscriber with an indication of the directory number dialed by the calling party rather than through changes to the mobile telephone. The present invention provides such a network implementation.

Review of each of the foregoing references reveals no disclosure or suggestion of a system or method such as that described and claimed herein.

In order to overcome the disadvantage of existing solutions, it would be advantageous to have a system and method of utilizing multiple telephone numbers with a single mobile telephone by changes to the cellular network rather than the mobile telephone. In addition, it would be advantageous for such a network implementation to provide the mobile subscriber with an indication of the directory number dialed by the calling party without any changes to the mobile telephone. The present invention provides such a system and method.

SUMMARY OF THE INVENTION

The present invention is a system and method of utilizing multiple telephone numbers with a single mobile telephone by changes to the cellular network rather than the mobile telephone. The present invention provides the mobile subscriber with an indication of the directory number dialed by the calling party without any changes to the mobile telephone.

In the network implementation of the system and method of the present invention, several directory numbers are first associated with one MIN, and then each directory number is associated with an alpha-numeric string which is transported through the network to the mobile telephone while the mobile telephone is being alerted.

Thus, in one aspect, the present invention is a system in a radio telecommunications network for utilizing multiple directory numbers with a single mobile telephone. The system comprises a database in the network for storing a plurality of directory numbers, a plurality of mobile identification numbers (MINs), and a plurality of alpha-numeric strings of characters. The system also comprises means in the network for associating a plurality of the directory numbers with a single MIN, means in the network for associating each one of the plurality of directory numbers associated with the single MIN with one of the plurality of alpha-numeric strings, and means in the network for transmitting one of the plurality of alpha-numeric strings associated with a dialed directory number to the mobile telephone while the mobile telephone is being alerted.

In another aspect, the present invention is a method in a radio telecommunications network of utilizing multiple directory numbers with a single mobile telephone. The method includes the step of storing, in a database in the network, a plurality of directory numbers, a plurality of mobile identification numbers (MINs), and a plurality of alpha-numeric strings of characters. This is followed by the steps of associating a plurality of the directory numbers with a single one of the MINs, the MIN being associated with a mobile telephone, and then associating each one of the plurality of directory numbers associated with the single MIN with one of the plurality of alpha-numeric strings. The method then determines which one of the plurality of associated directory numbers is dialed, and transmits, through the network to the mobile telephone while the mobile telephone is being alerted, the alpha-numeric string associated with the dialed directory number.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
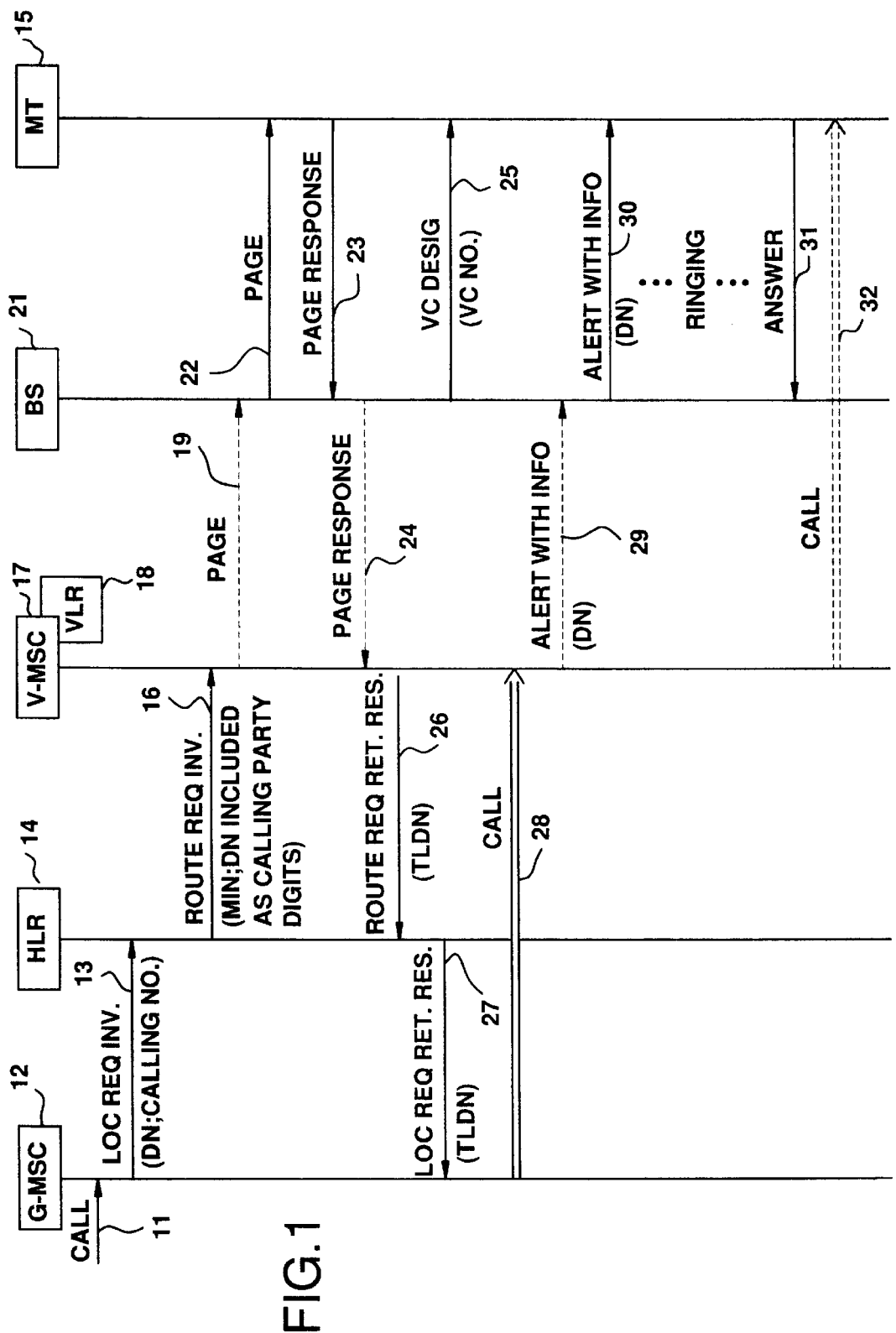
FIG. 1 is a message flow diagram illustrating the flow of messages between various nodes of a radio telecommunications network which has been modified to perform a first embodiment of the method of the present invention.

The invention provides a network implementation of a system that enables a mobile telephone to simultaneously operate with a plurality of telephone numbers. This enables a mobile subscriber to distinguish between callers that may be calling him on different business lines, a personal telephone number, or a home telephone number, etc. For example, a mobile plumber may have calls coming in on both his own local business telephone number as well as on a 800-number from a referral group. The system of the present invention identifies the number being called and notifies the subscriber while the telephone is ringing, thereby enabling the subscriber to answer the calls differently, depending on the called number.

The mobile telephone retains a single mobile identification number (MIN), and a plurality of telephone numbers are associated with the MIN. The network routes any calls placed to any of the plurality of telephone numbers to the subscriber's mobile telephone. The network distinguishes which of the plurality of telephone numbers has been dialed, and sends an indication to the mobile telephone which may then display the called number to the subscriber on the mobile telephone display. The information may be displayed on the display as simply Line 1, Line 2, or Line 3, or the called telephone number may be displayed.

The telephone has a single mobile identification number (MIN) and a plurality of directory numbers (DNs) associated with the MIN in the subscriber's home location register (HLR). An alpha-numeric string is associated with each dialed directory number in the subscriber's HLR. The action is passed to the mobile telephone through the network. The subscriber is capable of changing the action associated with each dialed telephone number.

An association is made in the HLR between a plurality of directory numbers, an equal plurality of alpha-numeric strings, and a single MIN. The MIN is then passed in a routing request (RouteReq) invoke message to a visited mobile switching center (V-MSC) where the called subscriber is located. The RouteReq invoke message may also contain a parameter with an alpha-numeric string associated with the directory number that was called. There may be some sharing of data between the HLR and the visitor location register (VLR) associated with the V-MSC so that this parameter does not have to be transmitted with each call to the same number. The V-MSC then associates the alpha-numeric string with a display message for the subscriber, and causes its base stations to page for the subscriber's mobile telephone. The display message is passed to the mobile telephone where it is displayed to the subscriber. The display message may be sent on a voice channel or across a digital control channel, for example by short message service (SMS) message.

While the above description has indicated that the alpha-numeric strings are stored in the HLR and are associated with the dialed directory numbers therein, it should be understood that this information may be stored elsewhere in the network and be passed to different nodes as needed. Likewise, the above description has indicated that the alpha-numeric strings are associated with the display messages in the V-MSC, but this association may be performed elsewhere with the required data passed to different nodes as needed.

The mobile telephone may display the called number itself, or some other associated word such as, for example, Home or Line 1. These functions may be performed either before or after a trunk is established between the G-MSC and the V-MSC.

The addition of the message parameter indicating an alpha-numeric string is an extension of IS-41 for signaling between the G-MSC, the HLR, and the V-MSC. The addition of the message parameter is an extension of IS-45 for signaling between the V-MSC and the base station, and is an extension of IS-54 or IS-136 for signaling between the base station and the mobile telephone. All of these standards are well known to those having ordinary skill reference in the radio telecommunications art.

Thus, in the network implementation of the system and method of the present invention, several directory numbers are first associated with one MIN, and then each directory number is associated with an alpha-numeric string which is transported through the network to the mobile telephone while the mobile telephone is being paged. FIG. 1 is a message flow diagram illustrating the flow of messages between various nodes of a radio telecommunications network which has been modified to perform a first embodiment of the method of the present invention. An incoming call 11 for a mobile telephone (MT) 15 may be received in a Gateway Mobile Switching Center (G-MSC) 12. The G-MSC then sends a Location Request Invoke (LocReq Inv) message 13 to a Home Location Register (HLR) 14 to obtain location information and subscriber profile information for the called mobile telephone 15. The LocReq Inv message 13 includes the dialed DN of the called MT 15 and the calling party's telephone number. The HLR 14 includes a database of directory numbers, MINs, and alpha-numeric strings. The HLR may associate a dialed directory number with one of a plurality of alpha-numeric strings, and may associate a plurality of directory numbers with a single MIN.

After making its associations, the HLR 14 sends a Routing Request Invoke (RouteReq Inv) message 16 to a Visited Mobile Switching Center (V-MSC) 17 and includes the MIN for the called mobile telephone and the dialed directory number (DN) in place of the calling party digits in a standard RouteReq Inv message. The V-MSC may have an associated Visitor Location Register (VLR) 18. The V-MSC 17 then sends a page request 19 to the base station 21. The base station, in turn, pages the mobile telephone at 22.

A page response 23 is sent back to the base station 21 when the mobile telephone is successfully located. The base station, in turn, relays the page response to the V-MSC at 24 and designates a voice channel 25 from the base station to the mobile telephone. The V-MSC 17 then sends a Routing Request Return Result (RouteReq R.R.) message 26 to the HLR 14 and includes a routing number such as a Temporary Location Directory Number (TLDN). The HLR then sends a Location Request Return Result (LocReq R.R.) message 27 to the G-MSC 12 and includes the TLDN. A trunk 28 is then established between the G-MSC and the V-MSC. In other embodiments, the trunk 28 may be established between the G-MSC and the V-MSC prior to paging for the mobile telephone.

The V-MSC 17 then sends an Alert With Info signal 29 to the base station 21. This signal is similar to the Alert With Info signal utilized to transmit a calling party's telephone number to a called party subscribing to the Calling Line Identification (CLI) feature. However, in the present invention, the V-MSC includes the called DN in place of the calling party's telephone number. The Alert With Info, including the DN, is sent to the mobile telephone at 30, and the called DN is displayed for the subscriber on the display of the mobile telephone during the ringing period. The subscriber may then answer the call at 31 in a manner suitable for the called DN. The call is then completed to the mobile telephone at 32.

Figure 2:
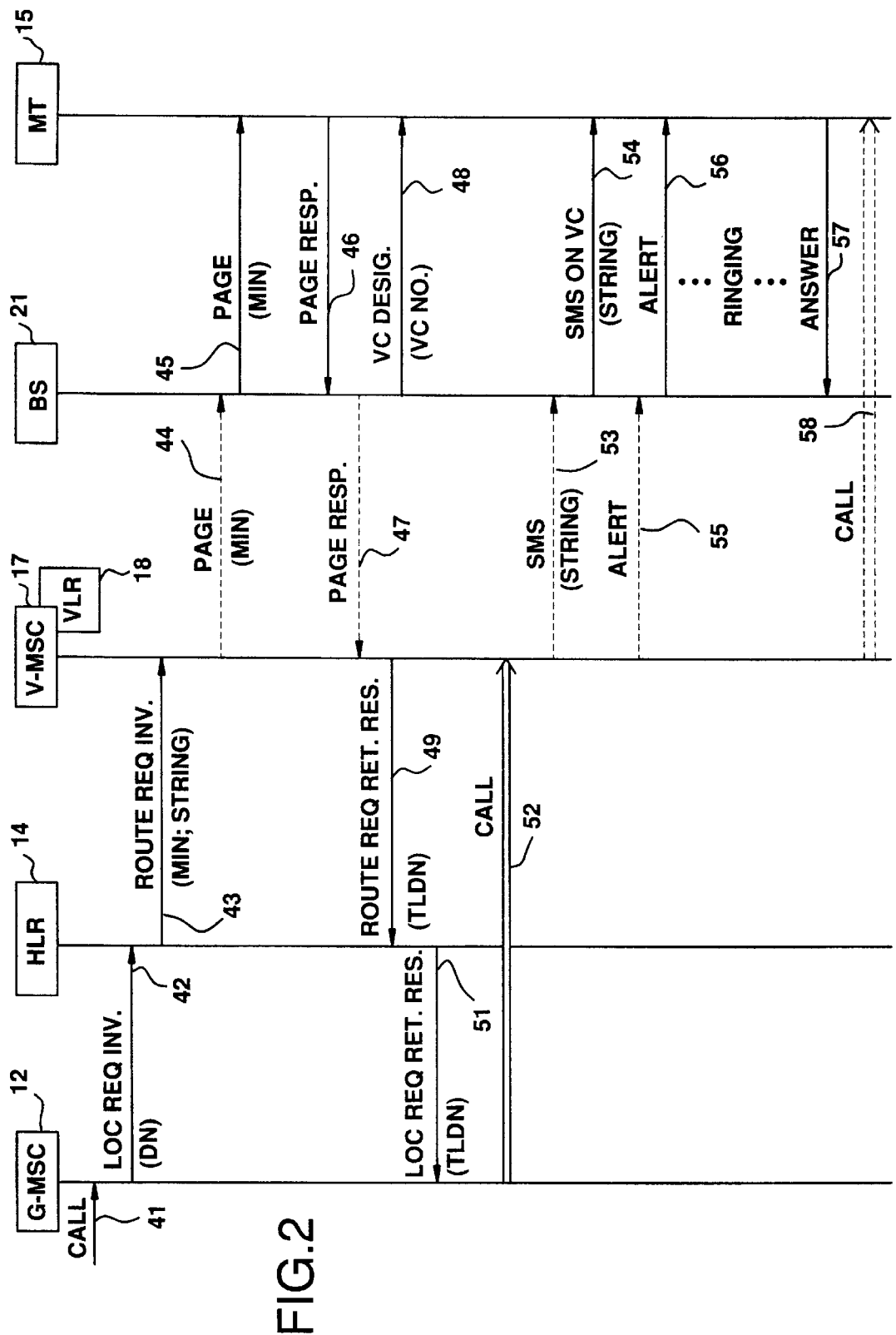
FIG. 2 is a message flow diagram illustrating the flow of messages between various nodes of a radio telecommunications network which has been modified to perform a second embodiment of the method of the present invention.

FIG. 2 is a message flow diagram illustrating the flow of messages between various nodes of the radio telecommunications network of FIG. 1 which has been modified to perform a second embodiment of the method of the present invention. An incoming call 41 for the mobile telephone (MT) 15 may be received in the G-MSC 12. The G-MSC then sends a Location Request Invoke (LocReq Inv) message 42 to the HLR 14 to obtain location information and subscriber profile information for the called mobile telephone 15. The LocReq Inv message 42 includes the DN of the called MT 15. The HLR 14 includes a database of directory numbers, MINs, and alpha-numeric strings. The HLR may associate the DN with one of a plurality of alpha-numeric strings, and may associate a plurality of DNs with a single MIN.

After making its associations, the HLR 14 sends a Routing Request Invoke (RouteReq Inv) message 43 to the V-MSC 17 and includes the MIN for the called mobile telephone and an alpha-numeric string associated with the dialed DN. The V-MSC 17 then sends a page request 44 to the base station 21. The base station, in turn, pages the mobile telephone at 45.

A page response 46 is sent back to the base station 21 when the mobile telephone is successfully located. The base station, in turn, relays the page response to the V-MSC at 47 and designates a voice channel 48 from the base station to the mobile telephone. The V-MSC 17 then sends a Routing Request Return Result (RouteReq R.R.) message 49 to the HLR 14 and includes a routing number such as a TLDN. The HLR then sends a Location Request Return Result (LocReq R.R.) message 51 to the G-MSC 12 and includes the TLDN. A trunk 52 is then established between the G-MSC and the V-MSC. In other embodiments, the trunk 52 may be established between the G-MSC and the V-MSC prior to paging for the mobile telephone.

At 53, the V-MSC 17 sends a short message service (SMS) message to the base station 21 with the alpha-numeric string which the HLR associated with the dialed DN and transmitted to the V-MSC in the RouteReq Inv message 43. When shown on the display of the mobile telephone, the string identifies the called telephone number. The base station then sends the SMS message with the string to the mobile telephone on the voice channel at 54. This is followed very shortly by an alert message 55 from the V-MSC to the base station and from the base station to the mobile telephone at 56. Thus, to the called subscriber, the SMS message string appears on the display of the mobile telephone nearly simultaneously with the beginning of the ringing. At 57, the subscriber may choose to answer the call in a manner appropriate for the called number, and the call is completed at 58.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network having a home location register (HLR) and a plurality of mobile switching centers (MSCs), a method of utilizing a plurality of directory numbers with a single called mobile telephone roaming within said plurality of MSCs and sending an alpha-numeric string to said called mobile telephone indicating which one of said plurality of directory numbers was dialed, said method comprising the steps of:

storing, in a database in said HLR, said plurality of directory numbers, a plurality of mobile identification numbers (MINs), and a plurality of alpha-numeric strings each of which identifies a different directory number when displayed to said subscriber;

receiving in a first MSC of said plurality of MSCs an incoming call to the mobile telephone;

sending a first message from the first MSC to the HLR indicating a dialed directory number of the mobile telephone;

associating in the HLR, the plurality of directory numbers with a single one of the MINs, the MIN being associated with the mobile telephone;

associating in the HLR, each one of the plurality of directory numbers associated with the single MIN with one of the plurality of alpha-numeric strings;

determining which one of the plurality of associated directory numbers is dialed;

determining a second MSC of said plurality of MSCs, said second MSC currently serving the mobile telephone;

sending a second message from the HLR to the second MSC, the second message including the MIN of the called mobile telephone and the alpha-numeric string associated with the dialed directory number;

establishing a trunk between the first MSC and the second MSC;

transmitting a third message from the second MSC to the called mobile telephone, the third message including the alpha-numeric string associated with the dialed directory number; and displaying the alpha-numeric string to the subscriber, the alpha-numeric string indicating to the subscriber the dialed directory number.

2. The method of utilizing a plurality of directory numbers with a single mobile telephone of claim 1 wherein said step of sending a first message from the first MSC to the HLR includes sending a Location Request Invoke message to the HLR utilizing an IS-41B communications protocol.

3. The method of utilizing a plurality of directory numbers with a single mobile telephone of claim 1 wherein said step of sending a second message from the HLR to a second MSC of said plurality of MSCs includes sending a Routing Request Invoke message to the second MSC utilizing IS-41B.

4. The method of utilizing a plurality of directory numbers with a single mobile telephone of claim 1 wherein said step of transmitting a third message from the second MSC to the called mobile telephone includes sending an IS-136A Alert with Info signal to the called mobile telephone.

5. The method of utilizing a plurality of directory numbers with a single mobile telephone of claim 1 wherein said step of transmitting a third message from the second MSC to the called mobile telephone includes sending a short message service (SMS) message to the called mobile telephone.

\* \* \* \* \*